(12) United States Patent
Lee et al.

(10) Patent No.: US 9,356,526 B2
(45) Date of Patent: May 31, 2016

(54) DC-DC POWER CONVERSION APPARATUS AND METHOD

(71) Applicant: Industrial Technology Research Institute, Hsinchu (TW)

(72) Inventors: Chi-Seng Lee, Hsinchu County (TW); Nan-Hsiung Tseng, Hsinchu County (TW); Chin-Hone Lin, Nantou County (TW); Wei-Han Lai, Blacksburg, VA (US); Hidekazu Miwa, Blacksburg, VA (US); Jih-Sheng Lai, Blacksburg, VA (US)

(73) Assignee: Industrial Technology Research Institute, Hsinchu (TW)

( * ) Notice: Subject to any disclaimer, the term of this patent is extended or adjusted under 35 U.S.C. 154(b) by 110 days.

(21) Appl. No.: 14/166,831

(22) Filed: Jan. 28, 2014

(65) Prior Publication Data

US 2015/0162845 A1 Jun. 11, 2015

(30) Foreign Application Priority Data

Dec. 6, 2013 (TW) .............................. 102144915 A (51) Int. Cl.
*H02M 3/335* (2006.01)
*H02M 1/00* (2006.01)

(52) U.S. Cl.
CPC .......... *H02M 3/33569* (2013.01); *H02M 3/335* (2013.01); *H02M 3/33507* (2013.01); *H02M 2001/0058* (2013.01); *H02M 2001/0077* (2013.01); *Y02B 70/1491* (2013.01)

(58) Field of Classification Search
CPC ...................... H02M 3/33507; H02M 3/33569; H02M 3/335
USPC ............................................. 363/17, 98, 132
See application file for complete search history.

(56) References Cited

U.S. PATENT DOCUMENTS 6,611,444 B2    8/2003    Ayyanar et al.
6,906,931 B1    6/2005    Batarseh et al.
(Continued)

FOREIGN PATENT DOCUMENTS

CN            1307396        8/2001
CN          101170279        4/2008
(Continued)

OTHER PUBLICATIONS

"Office Action of Taiwan Counterpart Application", issued on Apr. 20, 2015, p. 1-p. 3.
Yu et al., "Hybrid Half- and Full-Bridge Converter with High Efficiency and Full Soft-Switching Range," 2011 IEEE Energy Conversion Congress and Exposition (ECCE), Sep. 17-22, 2011, pp. 3080-3087.
(Continued)

*Primary Examiner* — Jue Zhang
(74) *Attorney, Agent, or Firm* — Jianq Chyun IP Office (57) ABSTRACT

A DC-DC power conversion apparatus and a DC-DC power conversion method are provided. The DC-DC power conversion apparatus includes a switching circuit, a main transformer circuit, a main rectifier circuit, an auxiliary transformer circuit and an auxiliary rectifier circuit. The switching circuit provides an input power to a primary winding of the main transformer circuit or a primary winding of the auxiliary transformer circuit by time-division. An AC input terminal of the main rectifier circuit is coupled to a secondary winding of the main transformer circuit. An AC input terminal of the auxiliary rectifier circuit is coupled to a secondary winding of the auxiliary transformer circuit. A power output terminal of the auxiliary rectifier circuit is coupled to a reference voltage terminal of the main rectifier circuit for lifting a voltage of the power output terminal of the main rectifier circuit.

12 Claims, 5 Drawing Sheets

(56) References Cited

U.S. PATENT DOCUMENTS

| | | | |
|---|---|---|---|
| 6,917,527 B2 * | 7/2005 | Takada | 363/16 |
| 6,954,367 B2 | 10/2005 | Yang et al. | |
| 7,202,649 B2 | 4/2007 | Bird et al. | |
| 7,518,886 B1 | 4/2009 | Lai et al. | |
| 8,363,427 B2 | 1/2013 | Anguelov et al. | |
| 2005/0270806 A1 * | 12/2005 | Zhu | 363/17 |
| 2013/0077356 A1 * | 3/2013 | Cohen | 363/21.02 |

FOREIGN PATENT DOCUMENTS

| | | |
|---|---|---|
| CN | 101944852 | 1/2011 |
| CN | 102843041 | 12/2012 |
| TW | 200427204 | 12/2004 |
| TW | 200622544 | 7/2006 |
| TW | M370886 | 12/2009 |
| TW | 201103245 | 1/2011 |
| WO | 2005015716 | 2/2005 |
| WO | 2005022732 | 3/2005 |
| WO | 2011011475 | 1/2011 |

OTHER PUBLICATIONS

Yu et al., "Hybrid Resonant and PWM Converter With High Efficiency and Full Soft-Switching Range," IEEE Transactions on Power Electronics, Dec. 2012, pp. 4925-4933, vol. 27, No. 12.

Ayyanar et al., "Novel soft-switching DC-DC converter with full ZVS-range and reduced filter requirement—Part I: Regulated-output applications," IEEE Transactions on Power Electronics, Mar. 2001, pp. 184-192, vol. 16, No. 2.

Ayyanar et al., "Novel soft-switching DC-DC converter with full ZVS-range and reduced filter requirement—Part II: Constant-input, variable-output applications," IEEE Transactions on Power Electronics, Mar. 2001, pp. 193-200, vol. 16, No. 2.

Liu et al., "High-Efficiency Hybrid Full-Bridge-Half-Bridge Converter With Shared ZVS Lagging Leg and Dual Outputs in Series," IEEE Transactions on Power Electronics, Feb. 2013, pp. 849-861, vol. 28, No. 2.

Jang et al., "A New ZVS-PWM Full-Bridge Converter," IEEE Transactions on Power Electronics, Sep. 2003, pp. 1122-1129, vol. 18, No. 5.

* cited by examiner

DC-DC POWER CONVERSION APPARATUS AND METHOD

CROSS-REFERENCE TO RELATED APPLICATION

This application claims the priority benefit of Taiwan application serial no. 102144915, filed on Dec. 6, 2013. The entirety of the above-mentioned patent application is hereby incorporated by reference herein and made a part of this specification.

TECHNICAL FIELD

The disclosure relates to a DC-DC power conversion apparatus and method.

BACKGROUND

Presently, an isolated DC-DC power converter applied to high power generally adopts a full-bridge phase-shift circuit structure. The full-bridge phase-shift circuit can achieve zero-voltage switching (ZVS). A phase-shift pulse width modulation (PWM) control method of a fixed switching frequency can also be implemented to the full-bridge phase-shift circuit structure. However, the full-bridge phase-shift circuit structure may lose a soft-switch effect when operating under a light load (or empty load) state, and a circulating loss generated in a heavy load operation is great, which leads to decrease of efficiency.

An existing composite DC-DC power converter having both of a phase-shift circuit and a resonant circuit may achieve the soft-switch effect for full load range, and meanwhile decrease the circulating loss. However, the existing composite DC-DC power converter has to be configured with a main transformer and an auxiliary transformer. The existing composite DC-DC power converter provides power to the load through the auxiliary transformer during a freewheeling period, and during a power transmitting period (a period of providing the maximum power), the existing composite DC-DC power converter provides power to the load through the main transformer, so that the main transformer be sufficient to supply a rated power. Namely, a power level of the main transformer is required to match the rated power, so that a volume of the main transformer is larger. The structure of dual-transformer leads to larger volume of the existing composite DC-DC power converter, and causes a poor overall power density.

SUMMARY

An embodiment of the disclosure provides a DC-DC power conversion apparatus including a switching circuit, a main transformer circuit, a main rectifier circuit, an auxiliary transformer circuit and an auxiliary rectifier circuit. The switching circuit is coupled to a primary winding of the main transformer circuit and a primary winding of the auxiliary transformer circuit. The switching circuit provides an input power to the primary winding of the main transformer circuit or the primary winding of the auxiliary transformer circuit by time-division. An AC input terminal of the main rectifier circuit is coupled to a secondary winding of the main transformer circuit, where a power output terminal of the main rectifier circuit serves as a power output terminal of the DC-DC power conversion apparatus. An AC input terminal of the auxiliary rectifier circuit is coupled to a secondary winding of the auxiliary transformer circuit. A power output terminal of the auxiliary rectifier circuit is coupled to a reference voltage terminal of the main rectifier circuit for lifting a voltage of the power output terminal of the main rectifier circuit. A reference voltage terminal of the auxiliary rectifier circuit is coupled to a secondary side reference voltage.

An embodiment of the disclosure provides a DC-DC power conversion method including following steps. A main transformer circuit is configured. An auxiliary transformer circuit is configured. A switching circuit is configured, where the switching circuit provides an input power to a primary winding of the main transformer circuit or a primary winding of the auxiliary transformer circuit by time-division. An output of a secondary winding of the auxiliary transformer circuit is rectified to obtain a base voltage. An output of a secondary winding of the primary transformer circuit is rectified to obtain an adding voltage. The adding voltage is lifted by using the base voltage to obtain an output voltage.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

A term "couple" used in the full text of the disclosure (including the claims) refers to any direct and indirect connections. For example, if a first device is described to be coupled to a second device, it is interpreted as that the first device is directly coupled to the second device, or the first device is indirectly coupled to the second device through other devices or connection means. Moreover, wherever possible, components/members/steps using the same referential numbers in the drawings and description refer to the same or like parts. Components/members/steps using the same referential numbers or using the same terms in different embodiments may cross-refer related descriptions.

Figure 1:
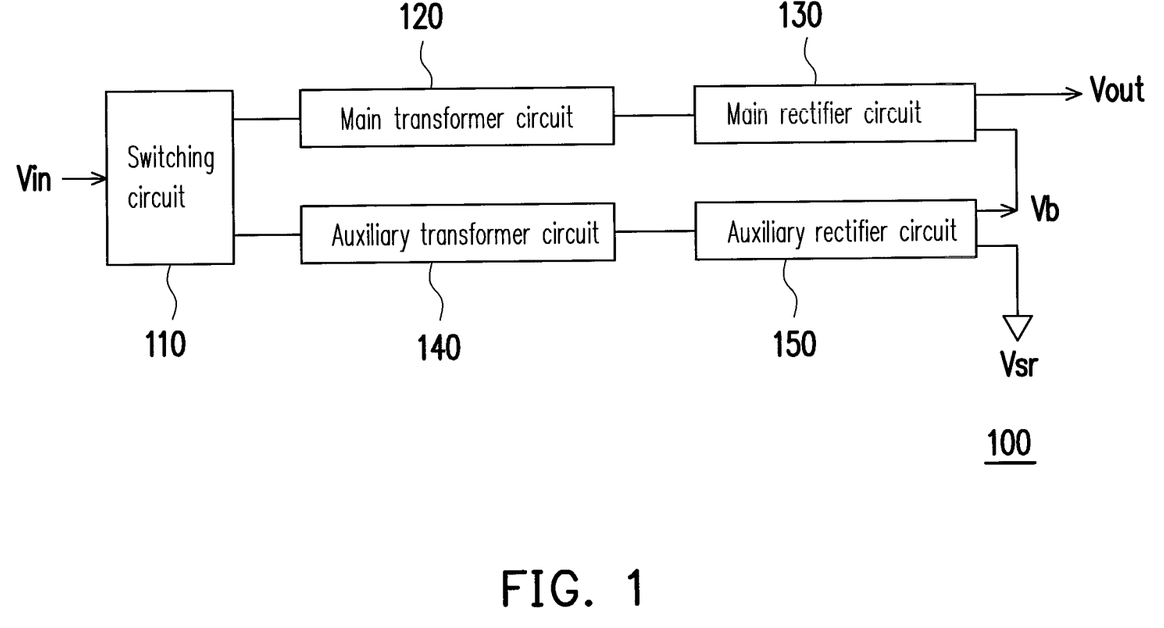
FIG. 1 is a circuit block schematic diagram of a DC-DC power conversion apparatus according to an embodiment of the disclosure.

FIG. 1 is a circuit block schematic diagram of a DC-DC power conversion apparatus according to an embodiment of the disclosure. The DC-DC power conversion apparatus includes a switching circuit 110, a main transformer circuit 120, a main rectifier circuit 130, an auxiliary transformer circuit 140 and an auxiliary rectifier circuit 150. The switching circuit 110 is coupled to a primary winding of the main transformer circuit 120 and a primary winding of the auxiliary transformer circuit 140. The switching circuit 110 provides an input power Vin to the primary winding of the main transformer circuit 120 and/or the primary winding of the auxiliary transformer circuit 140 by time-division.

An AC input terminal of the auxiliary rectifier circuit 150 is coupled to a secondary winding of the auxiliary transformer circuit 140. A reference voltage terminal of the auxiliary rectifier circuit 150 is coupled to a secondary side reference voltage Vsr. The secondary side reference voltage Vsr can be a secondary side ground voltage or other fixed voltage. The auxiliary rectifier circuit 150 rectifies an output power of the secondary winding of the auxiliary transformer circuit 140 to provide a base voltage Vb. A reference voltage terminal of the main rectifier circuit 130 is coupled to a power output terminal of the auxiliary rectifier circuit 150 and receives the base voltage Vb to serve as a reference voltage of the main rectifier circuit 130. Therefore, the main rectifier circuit 130 and the auxiliary rectifier circuit 150 can be regarded as being connected in series.

An AC input terminal of the main rectifier circuit 130 is coupled to a secondary winding of the main transformer circuit 120. A power output terminal of the main rectifier circuit 130 serves as a power output terminal of the DC-DC power conversion apparatus 100 to provide an output voltage Vout. The main rectifier circuit 130 rectifies an output power of the secondary winding of the main transformer circuit 120 to provide an adding voltage Va. Based on the serial connection structure, the base voltage Vb can lift the adding voltage Va to obtain the output voltage Vout complied with a rated specification. Therefore, the base voltage Vb of the auxiliary rectifier circuit 150 can lift the output voltage Vout at the power output terminal of the main rectifier circuit 130.

The power output terminal of the auxiliary rectifier circuit 150 can keep outputting the base voltage Vb to the reference voltage terminal of the main rectifier circuit 130. The base voltage Vb can serve as a part of a rated output power of the DC-DC power conversion apparatus 100. The main rectifier circuit 130 can compensate an insufficient part of the rated output power to provide the output power Vout (rated output power) to a load. Since the main transformer circuit 120 and the auxiliary transformer circuit 140 commonly provide a power to the load during a power transmitting period, transformers with a smaller power level (transformers with a smaller volume) can be used to implement the main transformer circuit 120 and/or the auxiliary transformer circuit 140. By using the transformers with smaller power level, a volume of the DC-DC power conversion apparatus 100 is decreased.

Figure 2:
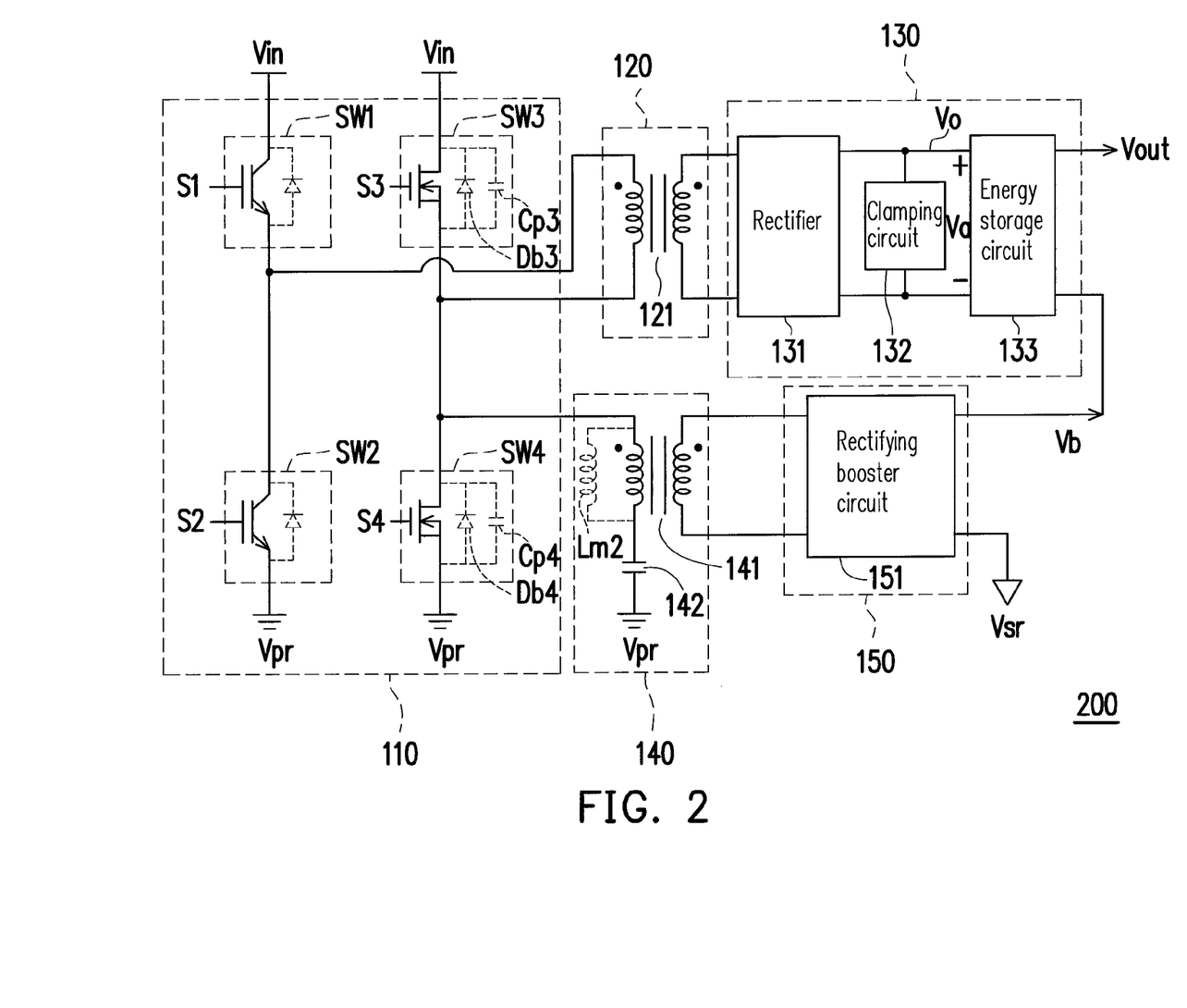
FIG. 2 is a circuit schematic diagram of a DC-DC power conversion apparatus according to another embodiment of the disclosure.

The implementation method of the DC-DC power conversion apparatus 100 of FIG. 1 is not limited by the disclosure. For example, FIG. 2 is a circuit schematic diagram of a DC-DC power conversion apparatus 200 according to another embodiment of the disclosure. The DC-DC power conversion apparatus 200 includes the switching circuit 110, the main transformer circuit 120, the main rectifier circuit 130, the auxiliary transformer circuit 140 and the auxiliary rectifier circuit 150. The switching circuit 110, the main transformer circuit 120, the main rectifier circuit 130, the auxiliary transformer circuit 140 and the auxiliary rectifier circuit 150 of FIG. 2 can be deduced with reference of related descriptions of the embodiment of FIG. 1.

Referring to FIG. 2, the main transformer circuit 120 includes a transformer 121. A first terminal and a second terminal of a primary winding of the transformer 121 are coupled to the switching circuit 110. A first terminal and a second terminal of a secondary winding of the transformer 121 are coupled to the main rectifier circuit 130. The auxiliary transformer circuit 140 includes a transformer 141 and a half-bridge resonant capacitor 142. A first terminal of a primary winding of the transformer 141 is coupled to the switching circuit 110. A first terminal of the half-bridge resonant capacitor 142 is coupled to a second terminal of the primary winding of the transformer 141. A second terminal of the half-bridge resonant capacitor 142 is coupled to a primary side reference voltage Vpr. The primary side reference voltage Vpr can be a primary side ground voltage or other fixed voltages. The half-bridge resonant capacitor 142 may provide resonant energy. A first terminal and a second terminal of a secondary winding of the transformer 141 are coupled to the auxiliary rectifier circuit 150.

The main rectifier circuit 130 includes a rectifier 131, a clamping circuit 132 and an energy storage circuit 133. An AC input terminal of the rectifier 131 is coupled to the secondary winding of the transformer 121 in the main transformer circuit 120. The rectifier 131 can rectify an AC current of the secondary winding of the transformer 121 into a DC current. The clamping circuit 132 is coupled to a DC output terminal of the rectifier 131. The clamping circuit 132 can clamp a voltage at the DC output terminal of the rectifier 131 to a predetermined voltage level to avoid generating a surge voltage. An input terminal of the energy storage circuit 133 is coupled to the DC output terminal of the rectifier 131. An output terminal of the energy storage circuit 133 is coupled to a power output terminal of the main rectifier circuit 130. The energy storage circuit 133 can filter an AC component of a voltage Vo at the DC output terminal of the rectifier 131. A reference terminal of the energy storage circuit 133 is coupled to the reference voltage terminal of the main rectifier circuit 130 to receive the base voltage Vb output by the auxiliary rectifier circuit 150. Based on the voltage (the base voltage Vb) at the reference voltage terminal of the main rectifier circuit 130, the energy storage circuit 133 can provide the output voltage Vout to the power output terminal of the main rectifier circuit 130.

The auxiliary rectifier circuit 150 includes a rectifying booster circuit 151. An AC input terminal of the rectifying booster circuit 151 is coupled to the secondary winding of the transformer 141 in the auxiliary transformer circuit 140. A reference voltage terminal of the rectifying booster circuit 151 is coupled to a secondary side reference voltage Vsr. A power output terminal of the rectifying booster circuit 151 is coupled to the reference voltage terminal of the auxiliary rectifier circuit 150 for providing the base voltage Vb. The rectifying booster circuit 151 can rectify an AC current of the secondary winding of the transformer 141 into a DC current, and increase a voltage of the secondary winding of the transformer 141 by a predetermined multiple.

The switching circuit 110 includes a first power switch SW1, a second power switch SW2, a third power switch SW3 and a fourth power switch SW4. A first terminal of the first power switch SW1 receives the input power Vin. A second terminal of the first power switch SW1 is coupled to the first terminal of the primary winding of the transformer 121 in the main transformer circuit 120. A control terminal of the first power switch SW1 receives a control signal S1. A first terminal of the second power switch SW2 is coupled to the second terminal of the first power switch SW1. A second terminal of the second power switch SW2 is coupled to the primary side reference voltage Vpr. A control terminal of the second power switch SW2 receives a control signal S2. A first terminal of the third power switch SW3 receives the input power Vin. A second terminal of the third power switch SW3 is coupled to the second terminal of the primary winding of the transformer 121 in the main transformer circuit 120. The second terminal of the third power switch SW3 is further coupled to the first terminal of the primary winding of the transformer 141 in the auxiliary transformer circuit 140. A control terminal of the third power switch SW3 receives a control signal S3. A first terminal of the fourth power switch SW4 is coupled to the second terminal of the third power switch SW3. A second terminal of the fourth power switch SW4 is coupled to the primary side reference voltage Vpr. A control terminal of the fourth power switch SW4 receives a control signal S4.

The first power switch SW1, the second power switch SW2, the third power switch SW3 and the fourth power switch SW4 can be implemented by any means. For example, the first power switch SW1, the second power switch SW2, the third power switch SW3 and the fourth power switch SW4 can be metal oxide semiconductor (MOS) transistors, bipolar junction transistors BJT or other power transistors. For another example, the first power switch SW1 and the second power switch SW2 respectively include an insulated gate bipolar transistor (IGBT), and the third power switch SW3 and the fourth power switch SW4 respectively include a MOS transistor. The IGBT of the first power switch SW1 and the second power switch SW2 respectively have a body diode. The third power switch SW3 and the fourth power switch SW4 respectively have a body diode and a parasitic capacitance.

Figure 3:
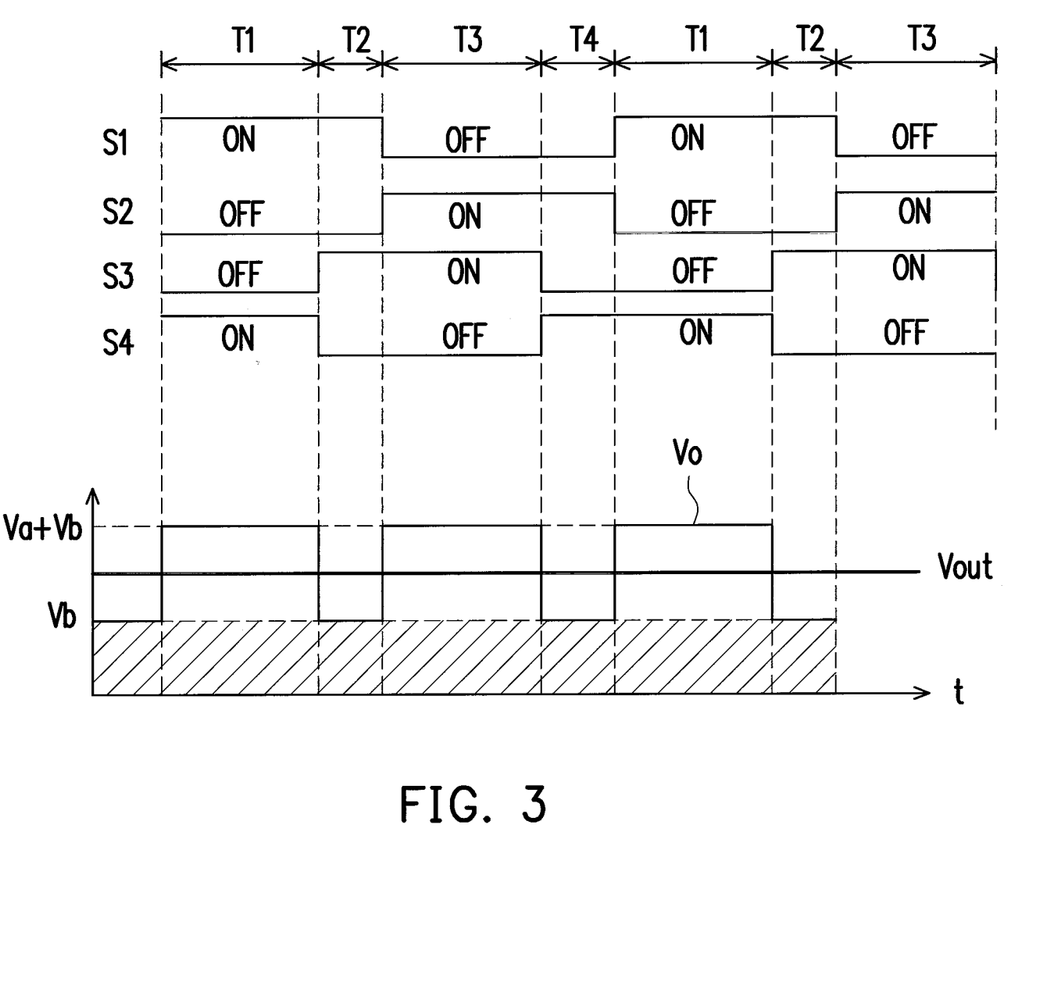
FIG. 3 is a timing schematic diagram of control signals of FIG. 2 according to an embodiment of the disclosure.

Operation phases of the first power switch SW1, the second power switch SW2, the third power switch SW3 and the fourth power switch SW4 are not limited by the disclosure. For example, FIG. 3 is a timing schematic diagram of the control signals S1, S2, S3 and S4 of FIG. 2 according to an embodiment of the disclosure. In FIG. 3, a horizontal axis represents time t. Referring to FIG. 2 and FIG. 3, during a power transmitting period T1, the first power switch SW1 and the fourth power switch SW4 are turned on, and the second power switch SW2 and the third power switch SW3 are turned off. Now, the voltage of the input power Vin is exerted to the first terminal of the primary winding of the transformer 121, and the primary side reference voltage Vpr is exerted to the second terminal of the primary winding of the transformer 121. An inducted AC current of the secondary winding of the transformer 121 is rectified to a DC current by the rectifier 131. The DC power output by the rectifier 131 can be stored in the energy storage circuit 133. Therefore, the energy storage circuit 133 can provide the output voltage Vout to the load. Meanwhile, the primary side reference voltage Vpr is exerted to the first terminal of the primary winding of the transformer 141. Charges previously stored in the half-bridge resonant capacitor 142 is discharged to the primary side reference voltage Vpr through the primary winding of the transformer 141. An inducted AC current of the secondary winding of the transformer 141 is rectified to a DC current by the rectifying booster circuit 151. The DC power (base voltage Vb) output by the rectifying booster circuit 151 is provided to the reference terminal of the energy storage circuit 133 through serial connection. The base voltage Vb of the rectifying booster circuit 151 can lift the output voltage Vout of the energy storage circuit 133. Therefore, during the power transmitting period T1, the main transformer circuit 120 and auxiliary transformer circuit 140 can commonly provide electric power to the load.

During a first freewheeling period T2, the first power switch SW1 and the third power switch SW3 are turned on, and the second power switch SW2 and the fourth power switch SW4 are turned off. Now, parasitic capacitances Cp3 and Cp4 of the third power switch SW3 and the fourth power switch SW4 are respectively discharged and charged by the energy of a magnetizing inductor Lm2 of the primary winding of the transformer 141. The body diode Db3 of the third power switch SW3 is forward biased, such that the third power switch SW3 is turned on under a zero voltage. The clamping circuit 132 can reset a primary side current of the transformer 121 during the first freewheeling period T2, such that a circulating current of the transformer 121 is zero, and a conduction loss generated by the circulating current is decreased. The first power switch SW1 can be turned off under the zero current.

During a commutation power transmitting period T3, the second power switch SW2 and the third power switch SW3 are turned on, and the first power switch SW1 and the fourth power switch SW4 are turned off. Now, the voltage of the input power Vin is exerted to the second terminal of the primary winding of the transformer 121, and the primary side reference voltage Vpr is exerted to the first terminal of the primary winding of the transformer 121. An inducted AC current of the secondary winding of the transformer 121 is rectified to a DC current by the rectifier 131. The DC power output by the rectifier 131 can be stored in the energy storage circuit 133. Therefore, the energy storage circuit 133 can provide the output voltage Vout to the load. Meanwhile, the voltage of the input power Vin is exerted to the first terminal of the primary winding of the transformer 141. Charges previously stored in the half-bridge resonant capacitor 142 are discharged to the primary side reference voltage Vpr through the primary winding of the transformer 141. An inducted AC current of the secondary winding of the transformer 141 is rectified to a DC current by the rectifying booster circuit 151. The DC power (base voltage Vb) output by the rectifying booster circuit 151 is provided to the reference terminal of the energy storage circuit 133 through serial connection. The base voltage Vb of the rectifying booster circuit 151 can lift the output voltage Vout of the energy storage circuit 133. Therefore, during the commutation power transmitting period T3, the main transformer circuit 120 and auxiliary transformer circuit 140 can commonly provide electric power to the load.

During a second freewheeling period T4, the second power switch SW2 and the fourth power switch SW4 are turned on, and the first power switch SW1 and the third power switch SW3 are turned off. Now, parasitic capacitances Cp3 and Cp4 of the third power switch SW3 and the fourth power switch SW4 are respectively charged and discharged by the energy of the magnetizing inductor Lm2 of the primary winding of the transformer 141. The body diode Db4 of the fourth power switch SW4 is forward biased, such that the fourth power switch SW4 is turned on under a zero voltage. The clamping circuit 132 can reset the primary side current of the transformer 121 during the second freewheeling period T4, such that the circulating current of the transformer 121 is zero, and a conduction loss generated by the circulating current is decreased. The second power switch SW2 can be turned off under the zero current.

After the energy storage circuit 133 filters the AC component of the voltage Vo at the DC output terminal of the rectifier 131, the energy storage circuit 133 can provide the output voltage Vout to the load. The electric power shown by a slash shading part of FIG. 3 is provided by the auxiliary transformer circuit 140. According to FIG. 3, it is known that the auxiliary transformer circuit 140 can keep outputting the base voltage Vb to provide a part of the rated output power through the auxiliary rectifier circuit 150 during the power transmitting period T1, the first freewheeling period T2, the commutation power transmitting period T3 and the second freewheeling period T4. The main transformer circuit 120 can provide the adding voltage Va during the power transmitting period T1 and the commutation power transmitting period T3 to compensate the insufficient part of the rated output power. Therefore, transformers with a smaller power level (transformers with a smaller volume) can be used to implement the main transformer circuit 120 and/or the auxiliary transformer circuit 140. By using the transformers with smaller power level, a volume of the DC-DC power conversion apparatus 100 is decreased.

Figure 4:
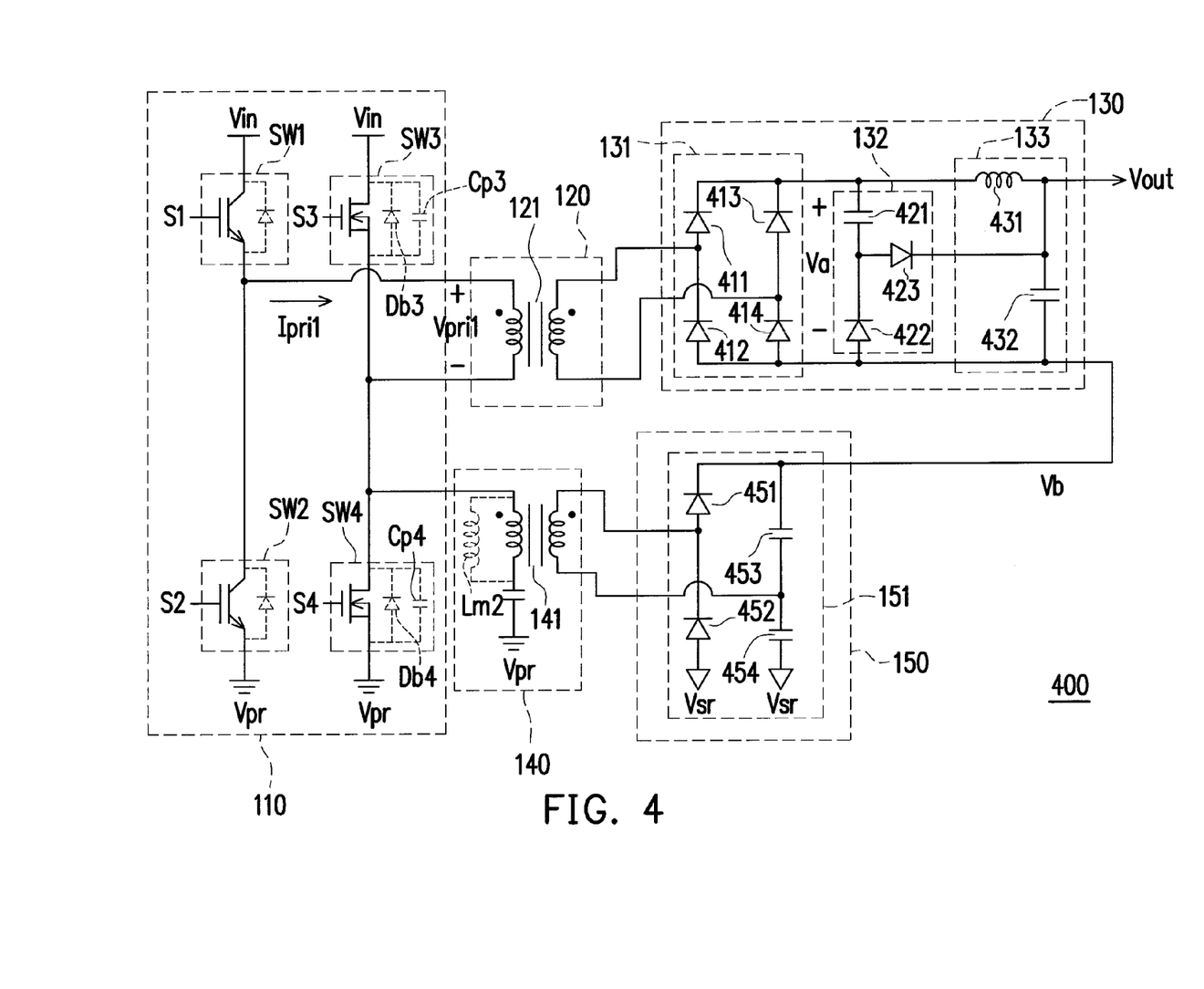
FIG. 4 is a circuit schematic diagram of a DC-DC power conversion apparatus according to still another embodiment of the disclosure.

FIG. 4 is a circuit schematic diagram of a DC-DC power conversion apparatus according to still another embodiment of the disclosure. The DC-DC power conversion apparatus 400 includes the switching circuit 110, the main transformer circuit 120, the main rectifier circuit 130, the auxiliary transformer circuit 140 and the auxiliary rectifier circuit 150. The switching circuit 110, the main transformer circuit 120, the main rectifier circuit 130, the auxiliary transformer circuit 140 and the auxiliary rectifier circuit 150 of FIG. 4 can be deduced with reference of related descriptions of the embodiment of FIG. 1. The switching circuit 110 of FIG. 4 includes the first power switch SW1, the second power switch SW2, the third power switch SW3 and the fourth power switch SW4. The first power switch SW1, the second power switch SW2, the third power switch SW3 and the fourth power switch SW4 shown in FIG. 4 can be deduced with reference of related descriptions of the embodiments of FIG. 2 and FIG. 3. The main rectifier circuit 130 of FIG. 4 includes the rectifier 131, the clamping circuit 132 and the energy storage circuit 133. The auxiliary rectifier circuit 150 of FIG. 4 includes the rectifying booster circuit 151. The rectifier 131, the clamping circuit 132, the energy storage circuit 133 and the rectifying booster circuit 151 can be deduced with reference of related descriptions of the embodiment of FIG. 2.

Referring to FIG. 4, the rectifying booster circuit 151 includes a diode 451, a diode 452, a capacitor 453 and a capacitor 454. An anode of the diode 451 is coupled to the first terminal of the secondary winding of the transformer 141 in the auxiliary transformer circuit 140. A cathode of the diode 451 is coupled to the power output terminal of the rectifying booster circuit 151. A cathode of the diode 452 is coupled to the anode of the diode 451. An anode of the diode 452 is coupled to the secondary side reference voltage Vsr. A first terminal of the capacitor 453 is coupled to the power output terminal of the rectifying booster circuit 151 for providing the base voltage Vb. A second terminal of the capacitor 453 is coupled to the second terminal of the secondary winding of the transformer 141 in the auxiliary transformer circuit 140. A first terminal of the capacitor 454 is coupled to the second terminal of the capacitor 453. A second terminal of the capacitor 454 is coupled to the secondary side reference voltage Vsr. When the current flows to the anode of the diode 451 from the first terminal of the secondary winding of the transformer 141, the current can charge the capacitor 453. When the current flows to the second terminal of the capacitor 453 from the second terminal of the secondary winding of the transformer 141, the capacitor 453 has a charge pump function to boost the base voltage Vb. Therefore, the rectifying booster circuit 151 simultaneously have a half-bridge rectifying function and a voltage doubling function (the charge pump function).

The energy storage circuit 133 includes an inductor 431 and an output capacitor 432. A first terminal and a second terminal of the inductor 431 are respectively coupled to the input terminal of the energy storage circuit 133 and the output terminal of the energy storage circuit 133. A first terminal of the output capacitor 432 is coupled to the output terminal of the energy storage circuit 133 for providing the output voltage Vout. A second terminal of the output capacitor 432 is coupled to the reference terminal of the energy storage circuit 133 for receiving the base voltage Vb provided by the rectifying booster circuit 151.

The rectifier 131 includes a diode 411, a diode 412, a diode 413 and a diode 414. An anode of the diode 411 is coupled to the first terminal of the secondary winding of the transformer 121 in the main transformer circuit 120. A cathode of the diode 411 is coupled to the power output terminal of the rectifier 131 for providing the rectified power to the input terminal of the energy storage circuit 133. A cathode of the diode 412 is coupled to the anode of the diode 411. An anode of the diode 412 is coupled to the reference terminal of the rectifier 131 for receiving the base voltage Vb provided by the rectifying booster circuit 151. A cathode of the diode 413 is coupled to the cathode of the diode 411. An anode of the diode 413 is coupled to the second terminal of the secondary winding of the transformer 121 in the main transformer circuit 120. A cathode of the diode 414 is coupled to the anode of the diode 413. An anode of the diode 414 is coupled to the reference terminal of the rectifier 131 for receiving the base voltage Vb provided by the rectifying booster circuit 151.

The clamping circuit 132 includes a clamping capacitor 421, a diode 422 and a diode 423. A first terminal of the clamping capacitor 421 is coupled to the DC output terminal of the rectifier 131. A cathode of the diode 422 is coupled to a second terminal of the clamping capacitor 421. An anode of the diode 422 is coupled to the reference terminal of the clamping circuit 132 for receiving the output (the base voltage Vb) of the auxiliary rectifier circuit 150. An anode of the diode 423 is coupled to the second terminal of the clamping capacitor 421. A cathode of the diode 423 is coupled to the first terminal of the output capacitor 432.

The DC-DC power conversion apparatus 400 can convert the input power Vin into the DC voltage and current required by the load. The DC voltage and current required by the load can be implemented by controlling the timing of the power switches SW1-SW4 in the switching circuit 110 according to a phase-shift pulse width modulation (PWM) method. The DC-DC power conversion apparatus 400 combines features of full-bright phase-shift PWM and LLC half-bridge resonant converter of a fixed frequency to achieve a low switching loss of zero-voltage switching (ZVS) of the right leg switches SW3 and SW4 and zero-current switching (ZCS) of the left leg switches SW1 and SW2. Operation timing of the power switches SW1-SW4 of FIG. 4 may refer to related description of FIG. 5.

Figure 5:
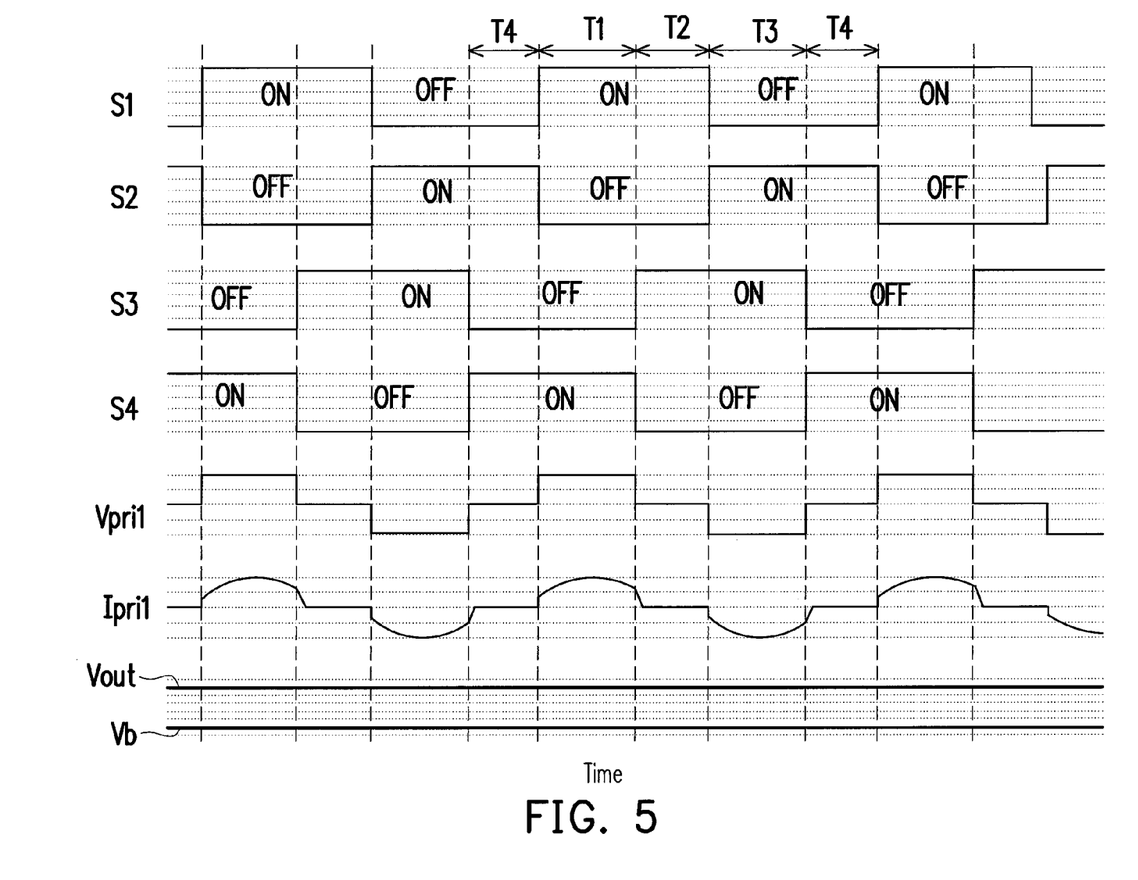
FIG. 5 is a timing schematic diagram of signals shown in FIG. 4 according to an embodiment of the disclosure.

FIG. 5 is a timing schematic diagram of the signals shown in FIG. 4 according to an embodiment of the disclosure. In FIG. 5, a horizontal axis represents time t. Vpril and Ipril in FIG. 5 respectively represent a primary side voltage Vpril and a primary side current Ipril of the transformer 121 of FIG. 4. The control signals S1, S2, S3 and S4 shown in FIG. 5 may refer to related descriptions of FIG. 3. Referring to FIG. 4 and FIG. 5, during the power transmitting period T1, the first power switch SW1 and the fourth power switch SW4 are turned on, and the second power switch SW2 and the third power switch SW3 are turned off. Now, the voltage of the input power Vin is exerted to the first terminal of the primary winding of the transformer 121, and the primary side reference voltage Vpr is exerted to the second terminal of the primary winding of the transformer 121. The inducted AC current of the secondary winding of the transformer 121 turns on the diode 411 and the diode 414, and the power output through the secondary winding of the transformer 121 can be stored in the inductor 431 of the energy storage circuit 133 for providing power to the load. Meanwhile, the power output by the secondary winding of the transformer 121 can charge the output capacitor 432 and the load through the clamping capacitor 421 and the diode 423 in the clamping circuit 132, so as to improve system efficiency. The base voltage Vb output by the rectifying booster circuit 151 is provided to the reference terminal of the rectifier 131, the reference terminal of the clamping circuit 132 and the reference terminal of the energy storage circuit 133 through serial connection. The base voltage Vb of the rectifying booster circuit 151 can lift the output voltage Vout of the energy storage circuit 133. Therefore, during the power transmitting period T1, the main transformer circuit 120 and the auxiliary transformer circuit 140 can commonly provide electric power to the load.

During the first freewheeling period T2, the first power switch SW1 and the third power switch SW3 are turned on, and the second power switch SW2 and the fourth power switch SW4 are turned off. Now, the parasitic capacitances Cp3 and Cp4 of the third power switch SW3 and the fourth power switch SW4 are respectively discharged and charged by the energy of a magnetizing inductor Lm2 of the primary winding of the transformer 141. The body diode Db3 of the third power switch SW3 is forward biased, such that the third power switch SW3 is turned on under the zero voltage. The clamping circuit 132 can reset the primary side current Ipril of the transformer 121 during the first freewheeling period T2, such that a circulating current of the transformer 121 is zero, and a conduction loss generated by the circulating current is decreased. The first power switch SW1 can be turned off under the zero current.

During the commutation power transmitting period T3, the second power switch SW2 and the third power switch SW3 are turned on, and the first power switch SW1 and the fourth power switch SW4 are turned off Now, the voltage of the input power Vin is exerted to the second terminal of the primary winding of the transformer 121, and the primary side reference voltage Vpr is exerted to the first terminal of the primary winding of the transformer 121. The induced AC current of the secondary winding of the transformer 121 turns on the diode 412 and the diode 413, and the power output through the secondary winding of the transformer 121 can be stored in the inductor 431 of the energy storage circuit 133 for providing power to the load. Meanwhile, the power output by the secondary winding of the transformer 121 can charge the output capacitor 432 and the load through the clamping capacitor 421 and the diode 423 in the clamping circuit 132, so as to improve system efficiency. The base voltage Vb output by the rectifying booster circuit 151 is provided to the reference terminal of the rectifier 131, the reference terminal of the clamping circuit 132 and the reference terminal of the energy storage circuit 133 through serial connection. The base voltage Vb of the rectifying booster circuit 151 can lift the output voltage Vout of the energy storage circuit 133. Therefore, during the commutation power transmitting period T3, the main transformer circuit 120 and the auxiliary transformer circuit 140 can commonly provide electric power to the load.

During the second freewheeling period T4, the second power switch SW2 and the fourth power switch SW4 are turned on, and the first power switch SW1 and the third power switch SW3 are turned off. Now, parasitic capacitances Cp3 and Cp4 of the third power switch SW3 and the fourth power switch SW4 are respectively charged and discharged by the energy of the magnetizing inductor Lm2 of the primary winding of the transformer 141. The body diode Db4 of the fourth power switch SW4 is forward biased, such that the fourth power switch SW4 is turned on under a zero voltage. The clamping circuit 132 can reset the primary side current Ipril of the transformer 121 during the second freewheeling period T4, such that the circulating current of the transformer 121 is zero, and a conduction loss generated by the circulating current is decreased. The second power switch SW2 can be turned off under the zero current.

In the embodiment of FIG. 4, the half-bridge LLC resonant converter is combined to the full-bridge phase-shift converter structure according to a method of sharing a lagging switch leg, such that the full load range can all achieve the soft-switch effect, and the circulating loss is also decreased. The induced voltages at the secondary windings of the transformer 121 and the transformer 141 are added through the serial connection and transmitted to the output terminal of the DC-DC power conversion apparatus 400. The transformer 141 can keep providing the voltage Vb to the main rectifier circuit 130 during a whole switch switching period. The transformer 121 is required to compensate the insufficient part of the output voltage Vout. Therefore, the power level and magnetic component specification of the transformer 121 can be greatly decreased to achieve effects of volume reduction and improvement of converter power density. According to the circuit of the present embodiment, 20% of the volume of the main transformer can be saved without influencing the global switch soft-switch effect of the primary side circuit. Moreover, the transformer 121 and the transformer 141 can commonly share the total output power, and utilization of the transformer 141 is accordingly improved. Besides that the volume is decreased to improve the whole converter power density, reduction of the magnetic component specification can also save the cost.

A DC-DC power conversion method is described below. The DC-DC power conversion method includes following steps. The main transformer circuit 120, the auxiliary transformer circuit 140 and the switching circuit 110 are configured, where the switching circuit 110 provides the input power Vin to the primary winding of the main transformer circuit 120 or the primary winding of the auxiliary transformer circuit 140 by time-division. An output of the secondary winding of the auxiliary transformer circuit 140 is rectified to obtain the base voltage Vb. An output of the secondary winding of the primary transformer circuit 120 is rectified to obtain the adding voltage Va. The adding voltage Va is lifted by using the base voltage Vb to obtain the output voltage Vout.

In some embodiment, the step of obtaining the base voltage Vb includes keeping outputting the base voltage Vb to provide a part of the rated output power, where the adding voltage Va can compensate the insufficient part of the rated output power. Therefore, the power level of and the magnetic component specification of the main transformer circuit 120 and the auxiliary transformer circuit 140 can be greatly decreased to achieve the effects of volume reduction and improvement of the converter power density.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A direct current (DC)-DC power conversion apparatus, comprising:
a main transformer circuit;
an auxiliary transformer circuit;
a switching circuit, coupled to a primary winding of the main transformer circuit and a primary winding of the auxiliary transformer circuit, wherein the switching circuit provides an input power to the primary winding of the main transformer circuit or the primary winding of the auxiliary transformer circuit by time-division;

a main rectifier circuit, having an alternating current (AC) input terminal coupled to a secondary winding of the main transformer circuit, wherein a power output terminal of the main rectifier circuit serves as a power output terminal of the DC-DC power conversion apparatus; and an auxiliary rectifier circuit, having an AC input terminal coupled to a secondary winding of the auxiliary transformer circuit, wherein a power output terminal of the auxiliary rectifier circuit is coupled to a reference voltage terminal of the main rectifier circuit for lifting a voltage of the power output terminal of the main rectifier circuit, and a reference voltage terminal of the auxiliary rectifier circuit is coupled to a secondary side reference voltage, wherein the main rectifier circuit comprises:
a rectifier, having an AC input terminal coupled to the secondary winding of the main transformer circuit;
a clamping circuit, coupled to a DC output terminal of the rectifier; and
an energy storage circuit, having an input terminal coupled to the DC output terminal of the rectifier, an output terminal coupled to the power output terminal of the main rectifier circuit, and a reference terminal coupled to the reference voltage terminal of the main rectifier circuit, wherein the energy storage circuit provides the output voltage to the power output terminal of the main rectifier circuit according to a voltage at the reference voltage terminal of the main rectifier circuit.

2. The DC-DC power conversion apparatus as claimed in claim 1, wherein the auxiliary rectifier circuit rectifies an output power of the secondary winding of the auxiliary transformer circuit to obtain a base voltage, and the base voltage is provided to the main rectifier circuit; and the main rectifier circuit rectifies an output power of the secondary winding of the main transformer circuit to obtain an adding voltage, and the base voltage is used for lifting the adding voltage to obtain an output voltage.

3. The DC-DC power conversion apparatus as claimed in claim 1, wherein the power output terminal of the auxiliary rectifier circuit keeps outputting a part of a rated output power of the DC-DC power conversion apparatus to the reference voltage terminal of the main rectifier circuit, and the main rectifier circuit compensate an insufficient part of the rated output power to output the rated output power.

4. The DC-DC power conversion apparatus as claimed in claim 1, wherein the switching circuit comprises:
a first power switch, having a first terminal receiving the input power, and a second terminal coupled to a first terminal of the primary winding of the main transformer circuit;
a second power switch, having a first terminal coupled to the second terminal of the first power switch, and a second terminal coupled to a primary side reference voltage;
a third power switch, having a first terminal receiving the input power, a second terminal coupled to a second terminal of the primary winding of the main transformer circuit and a first terminal of the primary winding of the auxiliary transformer circuit; and
a fourth power switch, having a first terminal coupled to the second terminal of the third power switch, and a second terminal coupled to the primary side reference voltage.

5. The DC-DC power conversion apparatus as claimed in claim 4, wherein the first power switch and the second power switch respectively comprise an insulated gate bipolar transistor, and the third power switch and the fourth power switch respectively comprise a metal oxide semiconductor transistor.

6. The DC-DC power conversion apparatus as claimed in claim 4, wherein
during a power transmitting period, the first power switch and the fourth power switch are turned on, and the second power switch and the third power switch are turned off;
during a first freewheeling period, the first power switch and the third power switch are turned on, and the second power switch and the fourth power switch are turned off;
during a commutation power transmitting period, the second power switch and the third power switch are turned on, and the first power switch and the fourth power switch are turned off; and
during a second freewheeling period, the second power switch and the fourth power switch are turned on, and the first power switch and the third power switch are turned off.

7. The DC-DC power conversion apparatus as claimed in claim 1, wherein the auxiliary transformer circuit comprises:
a transformer, comprising the primary winding of the auxiliary transformer circuit and the secondary winding of the auxiliary transformer circuit, wherein a first terminal of the primary winding of the transformer is coupled to the switching circuit; and
a half-bridge resonant capacitor, having a first terminal coupled to a second terminal of the primary winding of the transformer, and a second terminal coupled to a primary side reference voltage.

8. The DC-DC power conversion apparatus as claimed in claim 1, wherein the energy storage circuit comprises:
an inductor, having a first terminal and a second terminal respectively coupled to the input terminal of the energy storage circuit and the output terminal of the energy storage circuit; and
an output capacitor, having a first terminal coupled to the output terminal of the energy storage circuit, and a second terminal coupled to the reference terminal of the storage circuit.

9. The DC-DC power conversion apparatus as claimed in claim 8, wherein the clamping circuit comprises:
a clamping capacitor, having a first terminal coupled to the DC output terminal of the rectifier;
a first diode, having a cathode coupled to a second terminal of the clamping capacitor, and an anode coupled to a reference terminal of the clamping circuit for receiving an output of the auxiliary rectifier circuit; and
a second diode, having an anode coupled to the second terminal of the clamping capacitor, and a cathode coupled to the first terminal of the output capacitor.

10. The DC-DC power conversion apparatus as claimed in claim 1, wherein the auxiliary rectifier circuit comprises:
a rectifying booster circuit, having an AC input terminal coupled to the secondary winding of the auxiliary transformer circuit, a power output terminal coupled to the reference voltage terminal of the main rectifier circuit, and a reference voltage terminal coupled to the secondary side reference voltage.

11. The DC-DC power conversion apparatus as claimed in claim 10, wherein the rectifying booster circuit comprises:
a first diode, having an anode coupled to a first terminal of the secondary winding of the auxiliary transformer circuit, and a cathode coupled to the power output terminal of the rectifying booster circuit;

a second diode, having a cathode coupled to the anode of the first diode, and an anode coupled to the secondary side reference voltage;

a first capacitor, having a first terminal coupled to the power output terminal of the rectifying booster circuit, and a second terminal coupled to a second terminal of the secondary winding of the auxiliary transformer circuit; and a second capacitor, having a first terminal coupled to the second terminal of the first capacitor, and a second terminal coupled to the secondary side reference voltage.

12. The DC-DC power conversion apparatus as claimed in claim 1, wherein an auxiliary voltage generated by the auxiliary rectifier circuit is feed into the main rectifier circuit to lift an output voltage generated by the main rectifier circuit.

* * * * *